United States Patent [19]

Kurata et al.

[11] Patent Number: 5,734,741
[45] Date of Patent: Mar. 31, 1998

[54] PLATEMAKING PROCESS AND SYSTEM FOR PRINTING ABSTRACT PATTERNS ON ARCHITECTURAL MATERIALS

[75] Inventors: Michio Kurata; Toshio Modegi; Hideki Murota; Eisuke Arai, all of Tokyo, Japan

[73] Assignee: Dai Nippon Printing Co., Ltd., Tokyo, Japan

[21] Appl. No.: 279,276

[22] Filed: Jul. 22, 1994

Related U.S. Application Data

[63] Continuation of Ser. No. 802,270, Dec. 4, 1991, abandoned.

[30] Foreign Application Priority Data

Dec. 5, 1990 [JP] Japan .................................. 2-400530

[51] Int. Cl.$^6$ ........................................................ G06K 9/00
[52] U.S. Cl. .............................. 382/141; 382/112; 382/111
[58] Field of Search ................................ 382/1, 8, 100, 382/112, 141; 358/450, 452; 354/348; 101/463.1

[56] References Cited

U.S. PATENT DOCUMENTS

| | | | |
|---|---|---|---|
| 4,231,069 | 10/1980 | Wellendorf et al. | 358/450 |
| 4,403,249 | 9/1983 | Knop et al. | 358/450 |
| 4,422,101 | 12/1983 | Takei | 358/299 |
| 4,500,929 | 2/1985 | Buechler | 358/299 |
| 4,688,101 | 8/1987 | Doelves et al. | 358/299 |
| 4,692,796 | 9/1987 | Yamada et al. | 358/76 |
| 4,754,325 | 6/1988 | Ishida et al. | 358/452 |
| 4,962,421 | 10/1990 | Marai | 358/76 |
| 5,010,398 | 4/1991 | Nys et al. | 358/76 |
| 5,194,969 | 3/1993 | DiFrancesco | 358/450 |

*Primary Examiner*—Yon J. Couso
*Assistant Examiner*—Gerard Del Rosso
*Attorney, Agent, or Firm*—Dellett and Walters

[57] ABSTRACT

A method and system for making a baby-plate for use in printing abstract patterns on architectural materials wherein glitches are easily confirmed and removed. A unit material is read by an input scanner (1) and the image digitized into pixels of given density. The image data of the unit material is dissolve-composited repetitively M times vertically (M being a positive integer) and N times horizontally (N being a positive integer) in an endless processor (9) to construct pattern data of given size. Some pixels are culled from the pattern data by a glitch-checking processor (10) for creating reduced pattern data for display on the screen of a monitor (14) for determining the presence of an undesired pattern, i.e., a glitch, by viewing the screen of monitor (14). If there is a glitch, then the glitch is removed by a glitch removal processor (11). The glitch removal processor (11) operates according to three schemes—scramble, pixel copy and Fourier transform—depending on the state of the glitch for providing effective and efficient glitch removal.

9 Claims, 12 Drawing Sheets

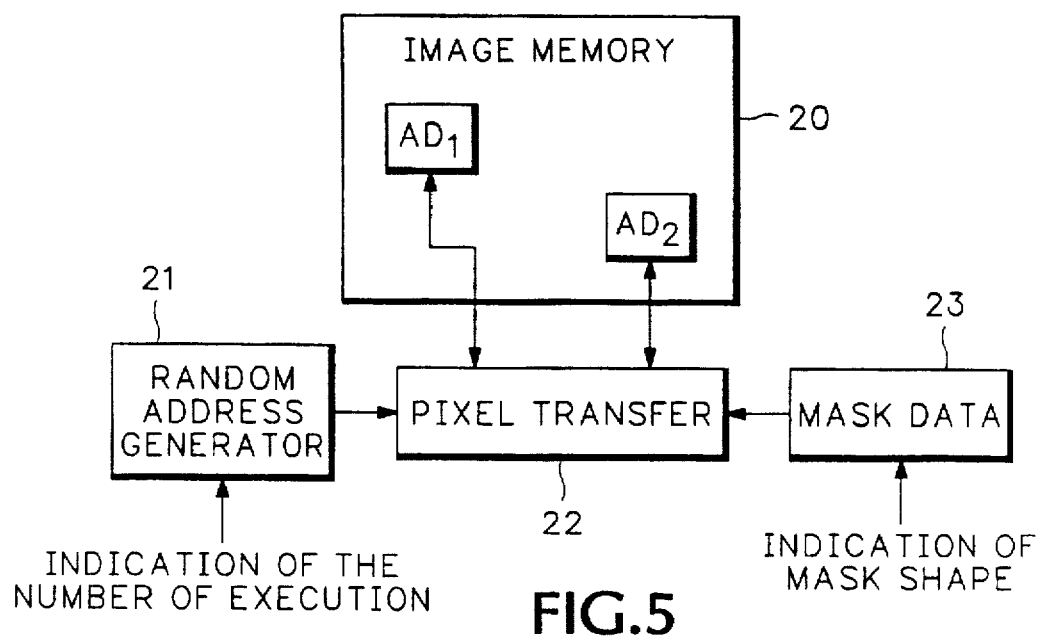
FIG.5
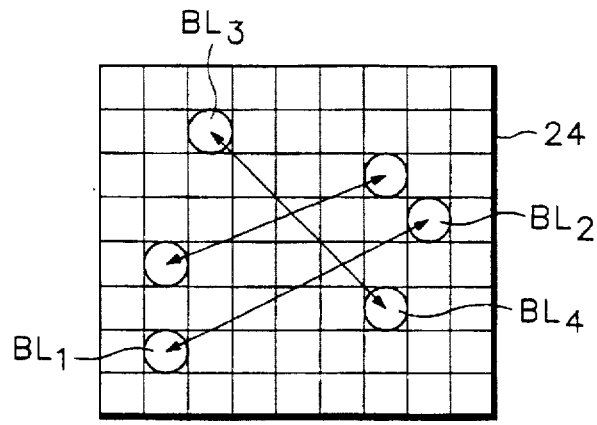
FIG.6
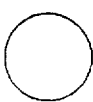 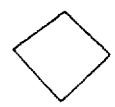 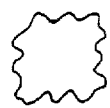 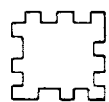 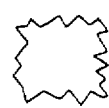
FIG.7A    FIG.7B    FIG.7C    FIG.7D    FIG.7E

PLATEMAKING PROCESS AND SYSTEM FOR PRINTING ABSTRACT PATTERNS ON ARCHITECTURAL MATERIALS

This is a continuation of application Ser. No. 07/802,270 filed on Dec. 4, 1991, now abandoned.

BACKGROUND OF THE INVENTION

This invention relates to a platemaking process and system for printing architectural materials, especially those having abstract patterns on their surfaces as well as printed materials obtained using the plate made with such a process and system.

As an alternative to wood or other natural materials now in short supply, various forms of architectural materials such as plywood and gypsum boards have recently been developed. In decorating and protecting the surfaces of such materials, printing techniques are now playing an important role.

Among patterns printed on architectural materials, there are grained patterns following such natural patterns as the grain of wood or a stone and man-made abstract patterns such as geometrical patterns, sand patterns, ground tints and flower patterns, as well known in the art. This invention relates to the latter abstract patterns, and so will be explained with reference to making plates with abstract patterns.

A conventional platemaking process for architectural materials with abstract patterns is diagrammatically illustrated in FIG. 18.

A material sample with an abstract pattern defined by designs, pictures, photographs, etc. is first fed to the platemaking process to take a photograph of the material sample with a process camera, thereby making a process film. This is successively composed by step-and-repeat printing (or film composition) with the application of a suitable mask to eliminate an out-of-register condition, if any, between this and material samples adjacent thereto, thereby making a precursor plate for a proof sheet (hereinafter called the "baby plate"). The film, on which the material sample has been photographed, is usually about 3 to 5 cm$^2$ in size. As shown in FIG. 18B, however, a plate of about 1 m$^2$ in size may be made by subjecting a film 101 to a step-and-repeat process nine times horizontally and nine times vertically. This is a baby plate 102.

Then, gravure engraving is carried out on the basis of the baby plate to make a press plate for gravure printing, followed by printing a proof. If the desired abstract pattern is obtained, the baby plate is then subjected to the step-and-repeat process to make a form plate, on the basis of which a press plate is in turn made for re-printing a proof. If the desired abstract pattern is again obtained, then printing is carried out with a printing machine.

The foregoing are the steps for making the baby plate by film composition, which are all manually carried out by an operator. In recent years, however, there has been an attempt to perform some of the above steps under electronic control by using a layout scanner. For instance, the layout scanner is used to perform the steps of reading a film on which a material sample has been photographed, repeating the resulting image data to produce outputs from the film, and making a baby plate. However, the step of subjecting the baby plate to the step-and-repeat process to make a form plate still relies on manual work including photographic composition of the baby plate.

As mentioned above, however, the conventional platemaking processes for printing architectural materials, for the most part, are manually carried out, not only posing the problem of high cost but also giving rise to a serious disadvantage as referred to below.

Some material samples vary in density or have distorted patterns. These variations in density or pattern distortions are not a problem to the material samples themselves, but they are accentuated on baby plates made by the step-and-repeat process, and show up in the form of a repeating pattern that was not intended by the creator or designer. This pattern repetition attracts much more attention than do the original abstract patterns, thus offering a grave problem. In the present disclosure, such a pattern repetition as not intended by the creator or designer will hereinafter be called a "glitch". Now, if a material sample 103 with a fine pattern (not shown) varying in density, as shown at 104 in FIG. 19A, is subjected to the step-and-repeat process seven times horizontally and four times vertically, as shown in FIG. 19B, to make a baby plate 105, then the recurring patterns of the density variation are accentuated on a press plate made on the basis of the baby plate 105, as shown in FIG. 19C, when it is used for gravure printing, giving rise to a glitch. When joints are applied to the press plate, however, the grating pattern of the joints attracts relatively more attention than does the glitch. Hence, even though there is a glitch, it is not a problem.

Thus, since the occurrence of glitches is a defect to architectural materials with abstract patterns, whether or not there is a glitch should be checked out somewhere in the process leading to printing with a form plate. So far, this has been achieved with a proof sheet. Confirmation of whether or not there is a glitch may possibly be achieved with the process film, but much difficulty would be involved in detecting the presence or absence of the glitch with a monochrome process film, because perception of the glitch depends upon color. What it all adds up to is that there is no choice but to detect the presence or absence of the glitch with the baby plate.

Glitch removal work is called retouching, where the remade mask is used to rearrange or rotate the pattern for film composition and the film is subjected to the step-and-repeat process to remake the baby plate. However, retouching requires not only a great deal of skill and work load, but is time-consuming as well, because all this is done manually. As a result, platemaking is costly.

In addition, some glitches can never be eliminated by manual retouching and end up causing a wasted plate.

The foregoing also hold good for using a layout scanner; that is, it is sure that the layout scanner enables the process leading to making the pattern on the baby plate to be automated, but it leaves the above problem unsolved, because retouching still relies on manual work. It goes without saying that the pattern of the material sample read by an input scanner may be displayed on a monitor screen to rotate it or subject it to the step-and-repeat process through a suitable mask, but this is essentially tantamount to manual retouching work in terms of work load. In other words, this is nothing but an alternative to optical work using a film, wherein a pointing device, like a mouse or stylus pen, is manipulated on the monitor screen. In addition, since the whole pattern of the baby plate of about 1 m$^2$ in size cannot be displayed on the monitor screen, it is impossible to confirm whether or not the pattern has been rendered glitch-free, even though retouch work could be performed on the monitor screen. To put it another way, it is impossible to see if glitches will have occurred on the basis of the material sample's pattern alone. It is after the material sample has been subjected to the step-and-repeat process to make a baby plate that the occurrence of glitches can be confirmed. Therefore, in order to determine the presence of a glitch, it is required that the whole pattern of the baby plate be displayed on the monitor screen, but this cannot be achieved with the monitor of a conventional layout scanner.

Furthermore, even if the whole pattern of the baby plate could be displayed on the monitor screen, thereby confirming that the baby plate is glitch-free, it is likely that a glitch may occur on a form plate which will be made by subjecting the baby plate to the step-and-repeat process. However, this cannot be solved by the conventional platemaking systems for printing abstract patterns on architectural materials using layout scanners.

SUMMARY OF THE INVENTION

In order to provide a solution to the above problems, this invention seeks to provide a platemaking process and system for printing abstract patterns on architectural materials, which renders it easy to make baby and form plates and achieve glitch-checking and removal.

Another object of this invention is to provide a platemaking process for printing abstract patterns on architectural material, which renders it easy to make baby plates.

A further object of this invention is to provide a platemaking system for printing abstract patterns on architectural materials, which can eliminate fine abstract patterns of glitches automatically.

A still further object of this invention is to provide a platemaking system for printing abstract patterns on architectural materials, which can eliminate abstract patterns of a relatively large area of glitches easily.

A still further object of this invention is to provide a platemaking system for printing abstract patterns on architectural materials, which can automatically eliminate density variations of the abstract patterns.

A still further object of this invention is to provide a material printed using the above platemaking processes and systems.

In order to attain the above objects, the present platemaking process for printing abstract patterns on architectural materials is characterized:

according to one aspect in that image data of a unit material as read by an input scanner are dissolve-composited vertically and horizontally to make an abstract pattern of given size, and said pattern is clipped or trimmed at equivalent positions on its upper, lower, left and right edges;

according to another aspect in that image data of a unit material as read by an input scanner are dissolve-composited vertically and horizontally to make a first abstract pattern of given size, said first abstract pattern is trimmed at equivalent position on its upper, lower, left and right edges, thereby making a second abstract pattern, and a plurality of said second abstract patterns are used to form a pattern array with no space among them, thereby forming a third abstract pattern for printing; and according to the third aspect in that image data of a unit material as read by an input scanner are dissolve-composited vertically and horizontally to make a first abstract pattern of given size, some pixels are extracted or culled out of said first abstract pattern to make a second abstract pattern, and a given number of said second abstract patterns are used to form a pattern array with no space among them, which is then displayed to confirm if an undesired pattern has occurred in said first abstract pattern.

The platemaking system for printing abstract patterns on architectural materials is characterized by including at least an input scanner, a first means for dissolve-compositing data image on a unit material read by said input scanner, thereby generating pattern data of given size, and a second means for retouching said pattern data generated by said first means for removing an undesired pattern which has occurred therein. Here the second means is characterized in that it is:

(1) a means for substituting a portion of the pattern data generated by said first means and lying at a given location by another portion lying at another given location on the basis of given mask data, thereby eliminating said undesired pattern;

(2) a means for generating mask data from a portion of the pattern data generated by said first means and lying at a given location and copying pixel data lying at a desired location to another desired location on the basis of said mask data, thereby eliminating said undesired pattern; and (3) a means for subjecting the pattern data generated by said first means to a two-dimensional Fourier transform to delete a given frequency region therefrom, followed by reverse Fourier transform, whereby said undesired pattern is eliminated.

The printed material of this invention is characterized:

according to one aspect in that it is obtained by dissolve-compositing image data of a unit material as read by an input scanner vertically and horizontally to make an abstract pattern of given size, trimming said abstract pattern at equivalent positions on its upper, lower, left and right edges, thereby obtaining an abstract pattern, making a press plate on the basis of the thus obtained abstract pattern and using said press plate for printing;

according to another aspect in that it is obtained by dissolve-compositing image data of a unit material as read by an input scanner vertically and horizontally to form a first abstract pattern of given size, trimming said abstract pattern at equivalent positions on its upper, lower, left and right edges, thereby forming a second abstract pattern, replicating said second abstract pattern a plurality of times with no space among them to form a third abstract pattern, making a press plate on the basis of said third abstract pattern, and using said press plate for printing; and according to the third aspect in that it is obtained by dissolve-compositing image data of a unit material as read by an input scanner vertically and horizontally to form a first abstract pattern of given size, extracting some pixels from said first abstract pattern to form a second abstract pattern, replicating said second abstract pattern a plurality of times with no space among them for display, whereby an undesired pattern, if any, is removed from said first abstract pattern, making a press plate on the basis of the thus obtained abstract pattern, and using said press plate for printing.

Furthermore, the printed material of this invention is characterized in that it is obtained by dissolve-compositing image data of a unit material as read by an input scanner to form a first pattern data of given size, removing an undesired pattern, if any, from said first pattern data to form a second pattern data, making a press plate on the basis of an abstract pattern generated from said second pattern data, and using said press plate for printing. Here the removal of the undesired pattern from said first abstract pattern is characterized in that:

(1) it is performed by replacing data lying at a given location on said first abstract pattern with data lying at another given location on the basis of given mask data, (2) it is performed by generating mask data from said data lying at said given location on said first pattern data and copying pixel data lying at a desired location to another different location on the basis of said mask data, and (3) it is performed by subjecting said first pattern data to a two-dimensional Fourier transform to remove a given frequency region, followed by a reverse Fourier transform.

According to this invention which makes any film unnecessary until baby-plate data are to be output, platemaking work can be carried out in a clean office environment, contributing to improved working conditions and heightening the will of workers to work.

According to this invention wherein an endless pattern is formed by dissolve-compositing unit materials, not only is that composition performed automatically, but whether or not there is a glitch can also be confirmed on the screen of the display means; even when a glitch is found in the endless pattern, some effective means can be taken to meet the situation at an early stage, not only thereby avoiding incurring some extra expense and reducing work load considerably but also thereby improving the accuracy of platemaking, thus leading to reductions in the platemaking cost and production time, and reducing the risk of schedule delays.

In addition, since whether or not there is a glitch can be confirmed at the endless pattern step, a glitch, if found, can be removed at an early stage.

This invention also makes it possible to automate retouching, which has so far been performed manually and required much skill and manual dexterity; a glitch, if found, can be removed within a short time, leading to not only cost reductions but reduction in production time.

Furthermore, this invention can easily cope with glitches which could not be removed manually.

BRIEF DESCRIPTION OF THE DRAWINGS

For a better understanding of the invention, and to show how the same may be carried into effect, reference will now be made, by way of example, to the accompanying drawings, in which:

FIG. 5 is a block diagram showing one example of the construction of glitch removal according to a scramble scheme, FIG. 6 is a view for illustrating the substitution of pixels in the block on the scramble scheme, FIG. 7 is a view showing examples of the geometry of the mask used for the substitution of pixels in the block.

DETAILED DESCRIPTION

One specific embodiment of this invention will now be explained with reference to the drawings.

Figure 1:
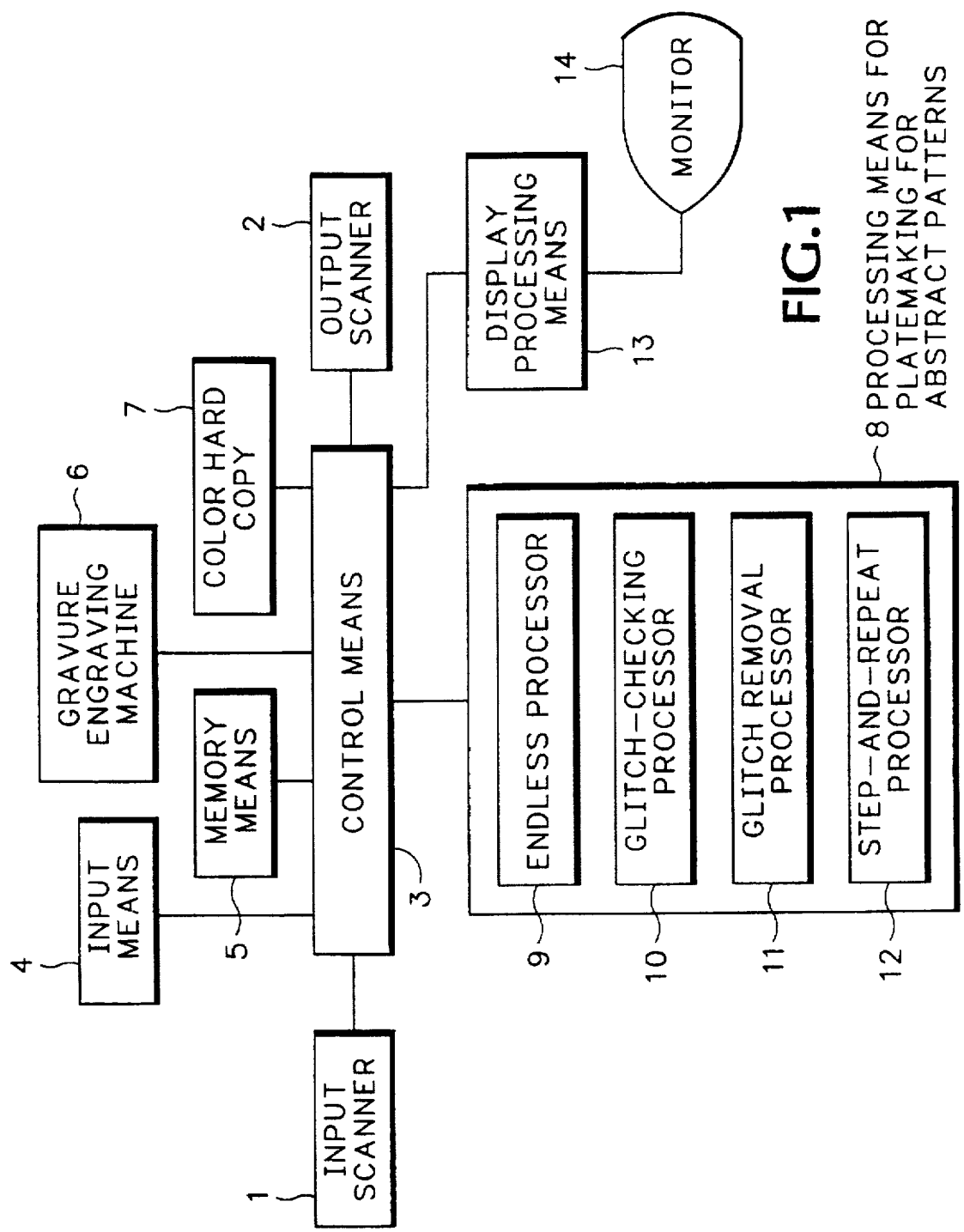
FIG. 1 is a block diagram showing the construction of one specific embodiment of the platemaking system for printing abstract patterns on architectural materials.

The construction of this embodiment of the platemaking system for printing abstract patterns on architectural materials is shown in FIG. 1, in which reference numeral 1 stands for an input scanner, 2 an output scanner, 3 control means, 4 input means, 5 memory means, 6 a gravure engraving machine, 7 color hard copy, 8 means for processing a plate with an abstract pattern, 9 an endless processor, 10 a glitch-checking processor, 11 a glitch removal processor, 12 a step-and-repeat processor, 13 display processing means, and 14 a monitor.

Referring to FIG. 1, the input scanner 1 scans a color film, on which a material sample has been photographed, to separate each pixel into four colors, i.e., cyan (C), magenta (M), yellow (Y) and black (K), and then outputs digital image data with a given bit number, e.g., 1 byte. This is similar in construction to that used with a conventional layout scanner.

The output scanner 2 outputs the colors C, M, Y and K from the film, and is similar in construction to that used with a conventional layout scanner.

The control means 3, as a whole, places the operation of the platemaking system for printing abstract patterns on architectural materials under control, and is made up of a microcomputer, ROM, RAM, etc.

The input means 4 is made up of such input devices as a keyboard and a pointing device.

The memory means 5 is constructed from memory devices such as RAM and/or a hard disk, etc.

The gravure engraving machine 6 is provided to engrave both a baby plate and a form plate.

The color hard copy 7 is made through a thermal sublimation transfer printer, an ink-jet printer or other printer. The printer used should have the capability to produce a color hard copy at least equal in size to the baby plate. More preferably, it should have the capability to produce a color hard copy having the size of the form plate.

The means 8 for processing a plate with an abstract pattern includes the endless processor 9, the glitch-checking processor 10, the glitch-removal processor 11 and the step-and-repeat processor 12, the operations of which will be referred to later.

The display processing means 13 is provided to control a display on the monitor 14, and includes a video RAM of given capacity corresponding to the number of pixels in the monitor 14.

The monitor 14 may be built up of such a display device as a color CRT, but should preferably be a device capable of providing high-precision displays.

Figure 2:
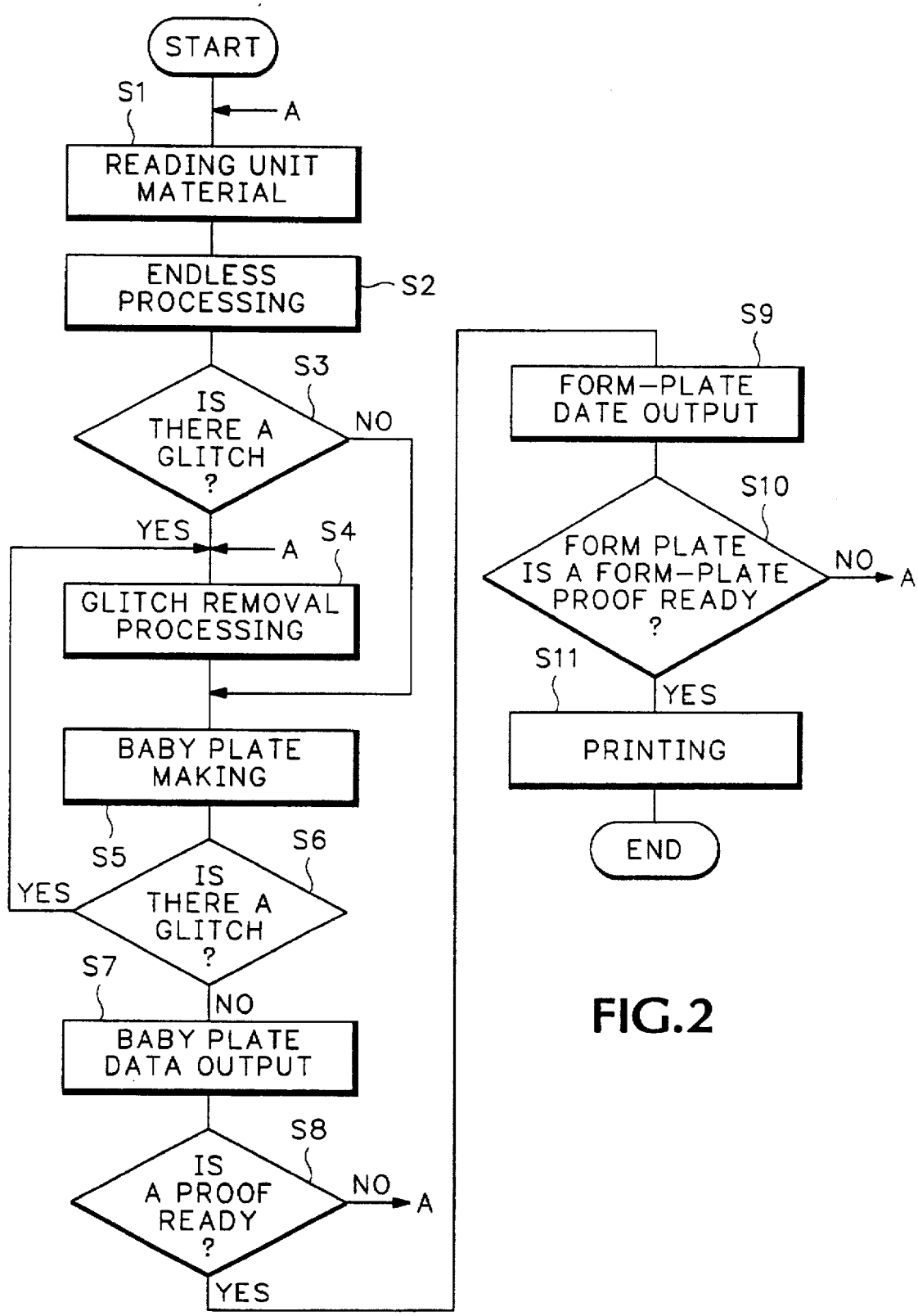
FIG. 2 is a block diagram showing one example of the platemaking process utilizing the present platemaking system for printing abstract patterns on architectural materials.

How the embodiment of FIG. 1 operates will now be explained with reference to FIG. 2. FIG. 2 is a block diagram showing an example of the platemaking process utilizing the platemaking system for printing abstract patterns on architectural materials, shown in FIG. 1. Upon receipt of a unit material that is the minimum recurring unit of an abstract pattern, the unit material is set on the input scanner and is read (Step S1), as with a conventional layout scanner. Bear in mind that when the unit material is a film, it can be set directly on the input scanner; however, in order to read a design or picture, etc., it may be reproduced on a color film for reading or, if required, it may be photographed with a process camera to form a process film for reading.

The image data on the unit material read at Step S1 are stored in the memory means 5.

Upon receipt of an instruction for endless processing from the input means 4, the control means 3 operates to drive the endless processor 9 of the processor means 8 to execute endless processing.

The term "endless processing" used herein refers to a process in which, while the unit material is being masked, unit materials vertically adjacent thereto are dissolve-composited to form pattern data 4 or 9 times larger in area than the unit material. In the present disclosure, the pattern obtained by endless processing will hereinafter be called the "endless pattern". The image data on the baby plate is obtained by simply repeating the endless pattern. That is, the endless pattern is formed intermediate the image data of the unit material and the baby plate. In other words, a conventional baby plate has so far been directly made by subjecting the unit material to the step-and-repeat process through a mask but, as already described, it takes much labor and time to make the baby plate, because the unit material is 3 to 5 cm$^2$ in size whereas the baby plate is about 1 m$^2$ in size. According to this invention, however, the endless pattern can be obtained by compositing the unit material approximately nine times at most, although masking is still applied. Since the baby plate can be automatically made by simply repeating the thus obtained endless pattern without recourse to any mask, the work load can be reduced as compared with the prior art.

In what follows, endless processing will be explained at great length with reference to FIG. 3.

Figure 3A:
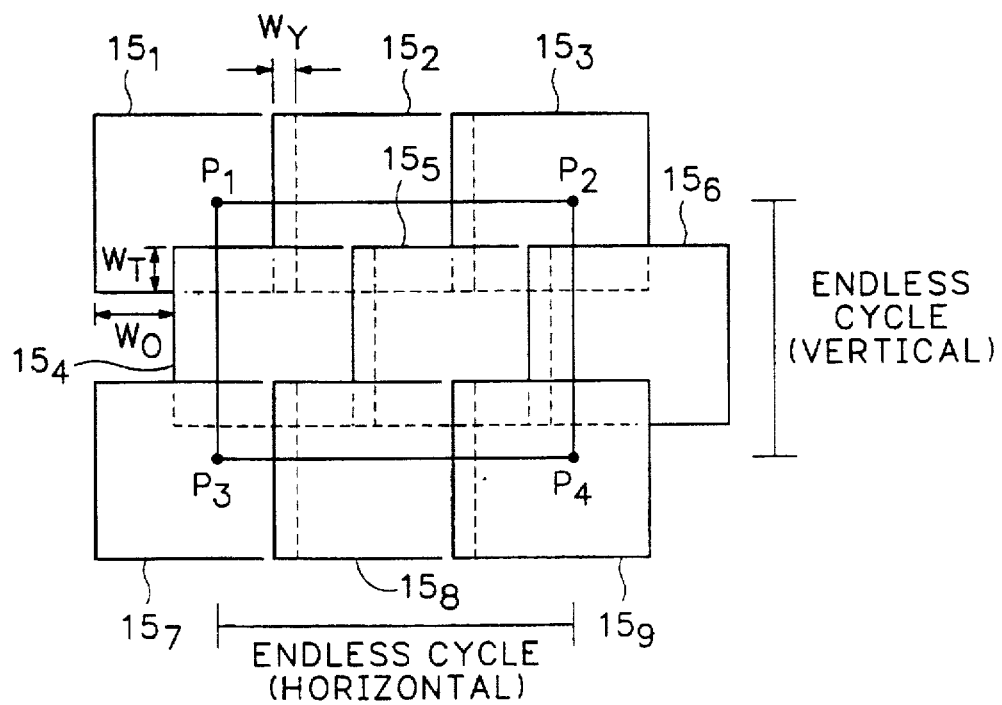
FIG. 3 is a diagram for showing the dissolve composition for making an endless pattern.
Figure 3B:
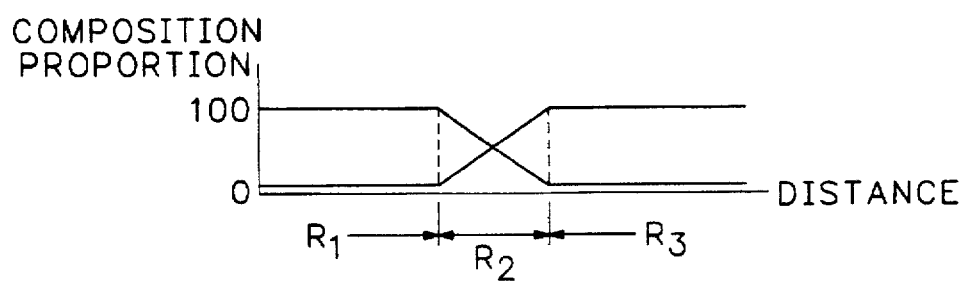

Now suppose that an instruction is given to composite the unit material three times horizontally and three times vertically to form the endless pattern. Then, the unit material will be composited three times horizontally and three times vertically in the endless processor 9. According to this invention, however, the composition is carried out horizontally with an overlapping width of $W_Y$ and vertically with an overlapping width of $W_T$, and the second row is displaced horizontally by an amount $W_O$, as depicted in FIG. 3A. Then, dissolve composition in the horizontally and vertically overlapping regions takes place at the proportion defined by $R_2$ in FIG. 3B. Referring here to the composition of unit materials $15_1$ and $15_2$ as an example, the proportion of the pattern of the unit material $15_1$ is 100% in a region $R_1$ in FIG. 3B, but it decreases linearly to 0% over a region $R_2$, while the proportion of the pattern of the unit material $15_2$ increases linearly from 0% to 100% over that region $R_2$ and is kept at 100% in a region $R_3$. This is also true of vertical composition.

Figure 3C:
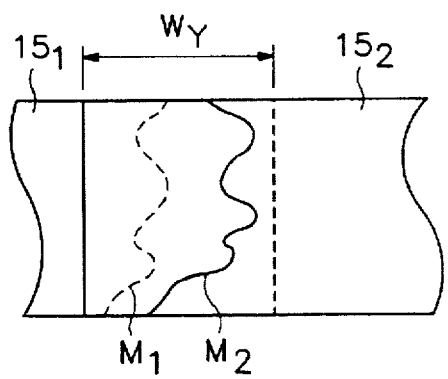

In this manner, automatic composition of the unit material is achieved. However, this is not suitable when it is expected that there might be a step between the overlapping regions of unit materials or a pattern of a relatively large area present in the overlapping regions might be lost by composition. For this reason, the endless processor 9 is designed to be operable in another mode in which a compositing mask can be located arbitrarily. In this mode, for instance, two masks $M_1$ and $M_2$ are located on horizontally overlapping regions, as depicted in FIG. 3C, and in the region sandwiched between them, dissolve composition may be performed at the proportion shown by a region $R_2$ in FIG. 3B. This is also true of vertical composition. Notice that for vertical composition, masks are separately located.

Note that the horizontally overlapping width $W_Y$, the vertically overlapping width $W_T$, and the displacement $W_O$ on the second row may all be preprogrammed as fixed values in the endless processor 9. Alternatively, they may be input by the operator through the input means 4. In order to locate the two masks, the patterns on the horizontally and vertically overlapping regions may be displayed on the monitor 14, on the screen of which the masks' outlines may be traced through a mouse or stylus pen to define the thus traced pattern data as mask pattern data. Note also that the masks located for horizontal composition are commonly usable for all horizontal composition and those located for vertical composition are commonly usable for all vertical composition.

Following completion of the composition of unit materials in the above manner, the endless processor 9 operates to display the composition results on the screen of the monitor 14. Now let us assume that a point $P_1$ (FIG. 3A) within the unit material $15_1$ of the composited pattern is selected to define an upper-left corner of a rectangle. Then, the endless processor 9 finds coordinate values of points $P_2$, $P_3$ and $P_4$, having the same address with respect to unit materials $15_3$, $15_7$ and $15_9$ respectively as point $P_1$ with unit material $15_1$. These points define the upper-right, lower-left and lower-right corners respectively of the rectangle. This rectangular portion of the composited pattern provides an endless pattern. Such delimitation or trimming prevents glitches from being generated in making the baby plate. As described later, the baby plate is made by simple repetition of the endless pattern. If the delimitation is performed as mentioned above, then no step is generated even when the endless pattern is repeated vertically, because the pattern on both sides of a line connecting two points $P_1$ and $P_2$ in FIG. 3A is quite the same as that on both sides of a line connecting two points $P_3$ and $P_4$. This is the reason why the pattern obtained by endless processing is called the endless pattern. The same also holds for horizontal composition.

The foregoing is the explanation of Step S2 shown in FIG. 2, and by making the endless pattern intermediate the image data of the unit material and the baby plate in this manner, It is possible to reduce work load much more as compared with the prior art.

Following completion of endless processing, whether or not there is a glitch in the endless pattern is judged (Step S3). According to the prior art, whether or not there is a glitch has been detected so far with a proof. However, the platemaking system for printing abstract patterns on architectural materials shown in FIG. 1 includes the glitch-checking processor 10, whereby the presence of a glitch can be determined early and easily.

Figure 4A:
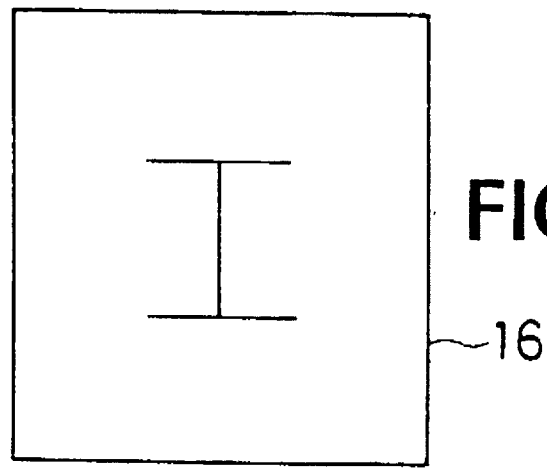
FIG. 4 is a view for illustrating how the glitch-checking processor operates.
Figure 4B:
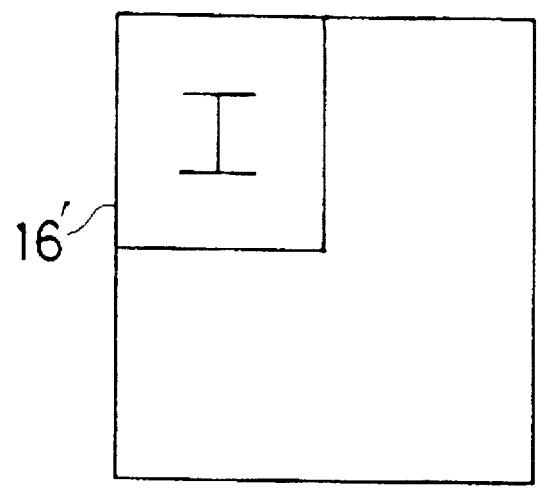
Figure 4C:
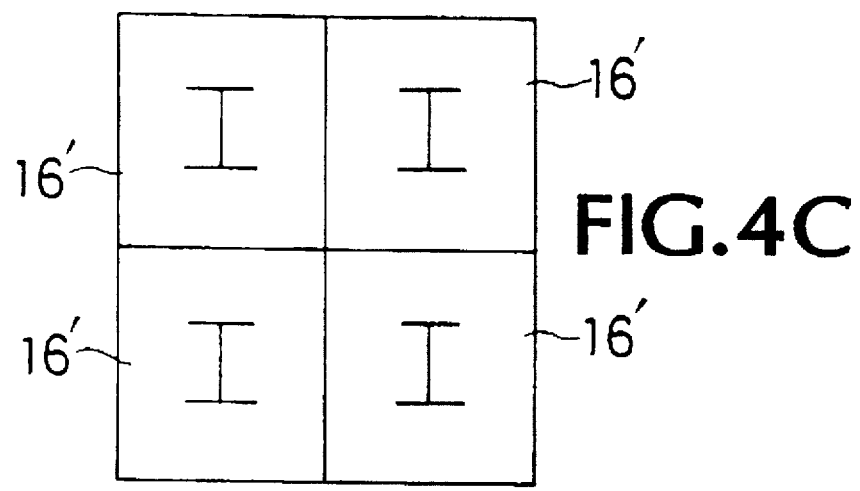

The glitch-checking processor 10 is driven by the control means 3 when a predetermined menu is selected by the input means 4, and gives access to the endless pattern made and registered in Step S2 to "cull out" (or extract some pixels from) the image data on the endless pattern to scale it down to a given magnification, e.g. quarter the original size. For instance, let us consider that the endless pattern is that shown in FIG. 4A. Then, the glitch-checking processor 10 operates to cull out the pixels in the endless pattern 16 at given intervals, thereby scaling it down to a quarter, as depicted at 16' in FIG. 4B. Subsequently, this processor 10 operates to repeat the thus scaled-down endless pattern both vertically and horizontally to form a pattern array with no space among the patterns, whereby a pattern array containing endless-pattern repetition is obtained, as shown in FIG. 4C. The processor 10 delivers this array to the display processor means 13 for display on the screen of the monitor 14.

Set out below is the reason why the endless pattern is scaled down and repeated for display. Since a glitch may be found, in some cases at the stage of the baby plate, as already mentioned, and in another case at the original plate. Whether or not there is a glitch should preferably be confirmed with a pattern as close to the original pattern as possible. Therefore, whether or not there is a glitch can easily enough be confirmed by scaling down and repeating the endless pattern for display, rather than by displaying the endless pattern alone on the screen of the monitor, as mentioned above.

To what degree the endless pattern is scaled down or how many times it is repeated vertically and horizontally may be a matter of option. The more the amount of the image data to be culled out, the more the number of repetition. However, culling out the image data could give rise to a change in the state of a glitch. Thus, it is desired that the scaled-down endless pattern be repeated twice or thrice vertically and twice or thrice horizontally, as depicted in FIG. 4C. Indeed, it has been found that this suffices in confirmation of the glitch.

If no glitch is detected on the screen of the monitor, as shown in FIG. 4C, then data for the baby plate are generated (Step S5), and if a glitch is detected, then it is removed. To this end, the platemaking system for printing abstract patterns on architectural materials according to this invention is provided with the glitch removal processor 11 working on the following three schemes:

First or scramble scheme in which a pattern located at a given address of the endless pattern is replaced with a pattern located at another address, thereby removing the glitch;

Second or pixel copy scheme in which a given pattern is shifted or rotated to other desired positions, thereby removing the glitch; and Third or Fourier transform scheme in which the unit material is cleared of a density variation, thereby removing the glitch.

Glitch removal on the scramble scheme will first be explained. The scramble scheme is suitable for removing glitches from such fine abstract patterns as sand patterns or ground tints. As can be best seen from FIG. 5, it includes two modes, one being a display mode for simulating glitch removal and the other a batch mode for performing glitch removal actually.

The glitch removal processor 11 is driven by the control means 3, when glitch removal is indicated by the input means 4. However, when glitch removal on the scramble scheme is indicated, the display mode of the scramble scheme is driven first.

In the interactive mode, the image data on the endless pattern are first culled out until pixels of about 2K×2K or less are obtained, and they are read in an image memory 20, whence they are transferred to display processor means 13 for display on the screen of the monitor 14. Then, the pixels in the endless pattern obtained by culling out the image data are divided into blocks of given size, each having about 200 pixels×200 pixels, for instance.

The operator selects a number Q of pixel block replacements to be performed, and this number Q is given to a random address generator 21 to generate random digits, thereby generating Q address pairs, each indicating two different pixel blocks, and transfers them to pixel block transfer means 22. One of the Q address pairs will be referred to as the addresses $AD_1$ and $AD_2$. Also, such various mask patterns as shown in FIGS. 7A to 7E have been registered in mask data storage means 23, and one mask pattern is called out of them by the input means 4 and transferred to the pixel transfer means 22, which in turn extracts the pixel data of the blocks positioned on the address pair $AD_1$ and $AD_2$, exchanges the pixels in these blocks in accordance with the mask geometry provided by the mask data storage means 23, and then returns the modified blocks to the respective original address positions. In consequence, the pixels in the mask pattern of the block at the address $AD_2$ are written in the mask pattern of the block at the address $AD_1$, and the pixels in the mask pattern of the block at the address $AD_1$ are written in the mask pattern of the block at the address $AD_2$. The foregoing operations are carried out Q times. Now let us assume that the culled-out endless pattern 24 is divided into 9 (columns) ×8 (rows) blocks, as depicted in FIG. 6, a mask pattern taking such a shape as shown in FIG. 7A is selected, and the random address generator 21 generates an address pair $BL_1$ and $BL_2$ in the first replacement processing. Then, the pixel block transfer processor 22 swaps an area of pixels of $BL_1$ with a corresponding area of pixels of $BL_2$, the areas of each being defined by the circular mask. Next, suppose that the address generator 22 generates an address pair $BL_3$ and $BL_4$. Then, the pixel block transfer processor 22 swaps similar areas of pixels of $BL_3$ and $BL_4$. This operation is carried out Q times.

After the replacement of the pixels in the blocks has been carried out by the number of execution indicated, the image data on the image memory 20 is sent to the display processing means 13 for display on the monitor 14, whereby the operator can confirm on the monitor 14 whether or not there is a glitch. If there is no glitch, the interactive mode is followed by execution of the batch mode. If there is a glitch, then the number of execution is input to repeat the foregoing operations.

The foregoing are the operations of the interactive mode, and the data on the number of execution and the mask shape at the time of completion of the display scheme are stored in a given file.

Hereinafter, how the batch mode operates will be explained. Upon confirmation of the fact that any glitch has been removed, the batch mode is indicated. At the time of the batch mode, the image data on the original endless pattern are written in the image memory 20, and the number of execution and the mask shape at the time of the interactive mode are loaded in the random address generator 21 and mask data storage means 23, respectively, thereby performing the above replacement of the pixels in the blocks.

The image data on the endless pattern, which has been cleared of a glitch, if any, in this manner, are registered in a given file of the storage means 5. Note that when the image data on the endless pattern are separated into four colors, Y, M, C and K, the image memory 20 must have a capacity of about 8K×8K×8×4 (bits) in order to perform the above scramble processing for all the colors. This is because one pixel in the data on one color is 8 bits.

While the use of only one mask pattern has been described, the mask pattern may be selected at random from the available mask patterns at each replacement. Alternatively, it may be possible to generate addresses corresponding to pixels of two areas of the pattern to be swapped on a pixel-by-pixel basis without first forming replacement blocks, the areas of each for swapping being defined according to the given mask pattern. In the above embodiment, the image resulting from pixel replacement is displayed on the monitor 14 after Q executions have been carried out. However, if the image is displayed every time 100 pixel replacements have been carried out, an operator may determine that a glitch has been removed and stop further replacements.

In the way as mentioned above, it is possible to perform glitch removal work automatically, which has so far been carried out manually.

Figure 8:
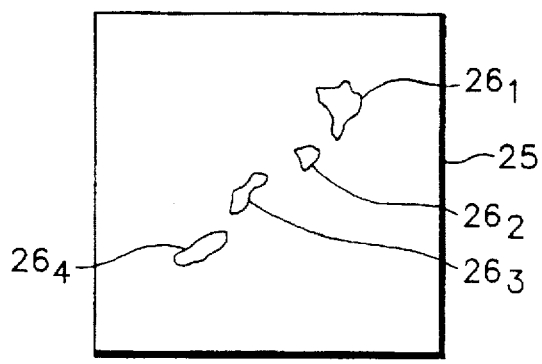
FIG. 8 is a view for showing the effectiveness of a pixel copy scheme.

The foregoing has explained how glitches are removed using the scramble scheme. In what follows, how glitches are removed on the pixel copy scheme will be explained. The pixel copy scheme is applied to retouching a distinctive abstract pattern of relatively large size, such as a grained pattern, of glitches. In other words, when a unit material 25 has an archipelagic arrangement of patterns $26_1$ to $26_4$ of relatively large size, as depicted in FIG. 8, it is likely to give rise to a glitch. If it is intended to remove such a glitch using the scramble scheme, these distinctive patterns may then possibly be lost, because the image of the endless pattern is divided into blocks using this scheme. To this end, the pixel copy scheme is provided, thereby retouching such a distinctive abstract pattern of the glitch.

Figure 9:
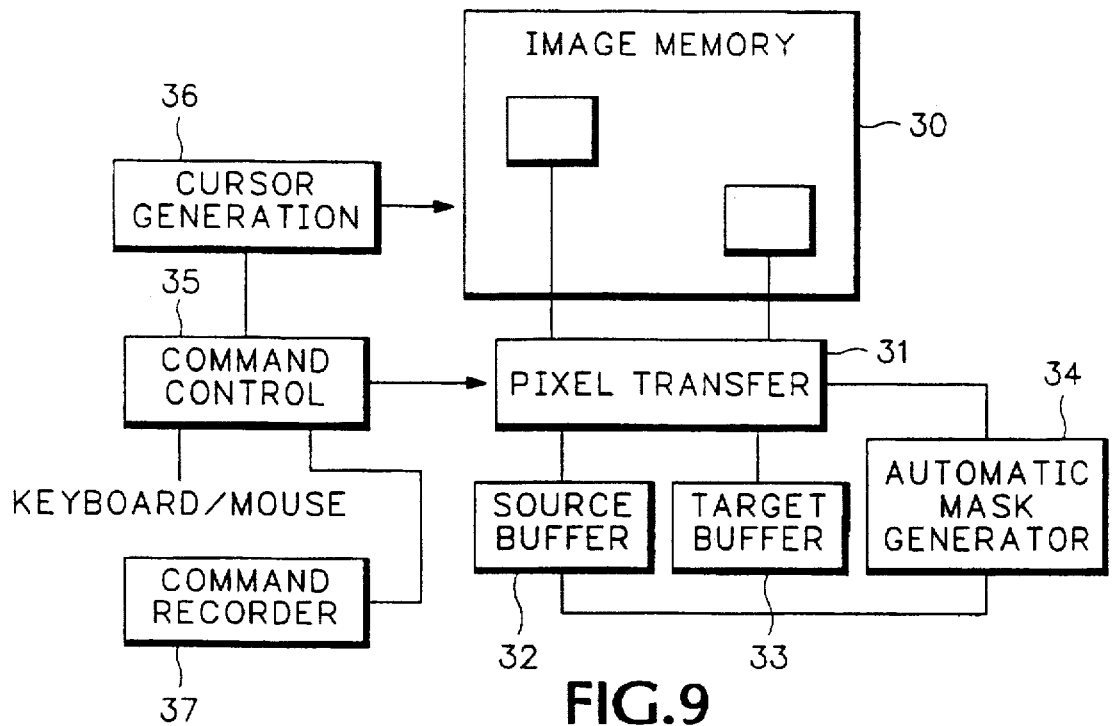
FIG. 9 is a block diagram showing one example of the construction for glitch removal on the pixel copy scheme.

As diagrammatically shown in FIG. 9, the pixel copy scheme is carried out in two modes, one being an interactive type mode for simulating pixel copy on the screen of the monitor 14 in an interactive mode and the other a batch mode in which the same processing as carried out in the interactive mode is performed automatically.

Upon receipt of an instruction to remove a glitch using the pixel copy scheme, the interactive mode is driven, whereby the image data of the endless pattern is culled out until the number of pixels is reduced to about 2K×2K, and read in the image memory 30. The image data on the image memory 30 is also sent to the display processing means 13 for display on the screen of the monitor 14.

Figure 10:
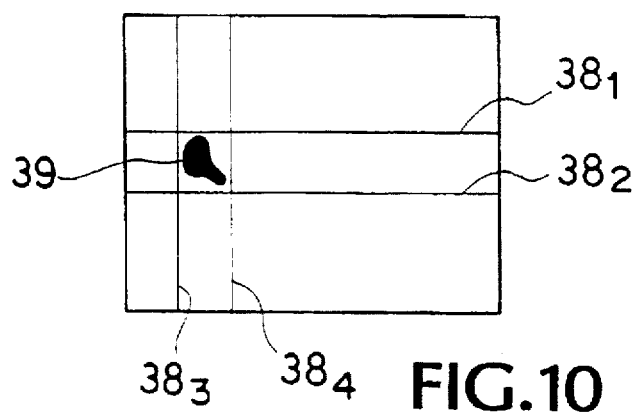
FIG. 10 is a view showing one example of the display screen in selecting source patterns.

While viewing the screen on the monitor 14, the operator selects a pattern to be moved (which will hereinafter be referred to as the "source pattern"). Selection of the source pattern is performed by indicating opposite apexes of a region surrounding the source pattern by mouse dragging. At this time, the movement of the mouse is sent to a command controller 35 to cause a cursor generator 36 to generate a cursor pattern, which is then written in the location of the mouse on the image memory 30. In consequence, cursors $38_1$–$38_4$ such as those shown in FIG. 10 are displayed on the screen of the monitor 14, and their addresses are recorded in a command recorder 37. It is noted that in FIG. 10 the source pattern is shown at 39.

When a rectangular region is thus indicated, a pixel block transfer processor 31 operates to transfer the pixel data in said rectangular region to a source buffer 32, the content of which is then transferred to an automatic mask generator 34, where a source pattern mask is generated as follows. That is, the automatic mask generator 34 applies an operation of 0.3R+0.59G+0.11B to the image data of the three primary colors, R, G and B being transferred from the source buffer 32, thereby making the image monochromatic. Then, this monochrome image is processed a predetermined number of times, e.g., 20 times, through a smoothing filter, whereby fine patterns are erased, leaving only a pattern having a large area. Note that smoothing may be achieved in known manner as by taking the average of nine neighboring pixels.

Figure 11:
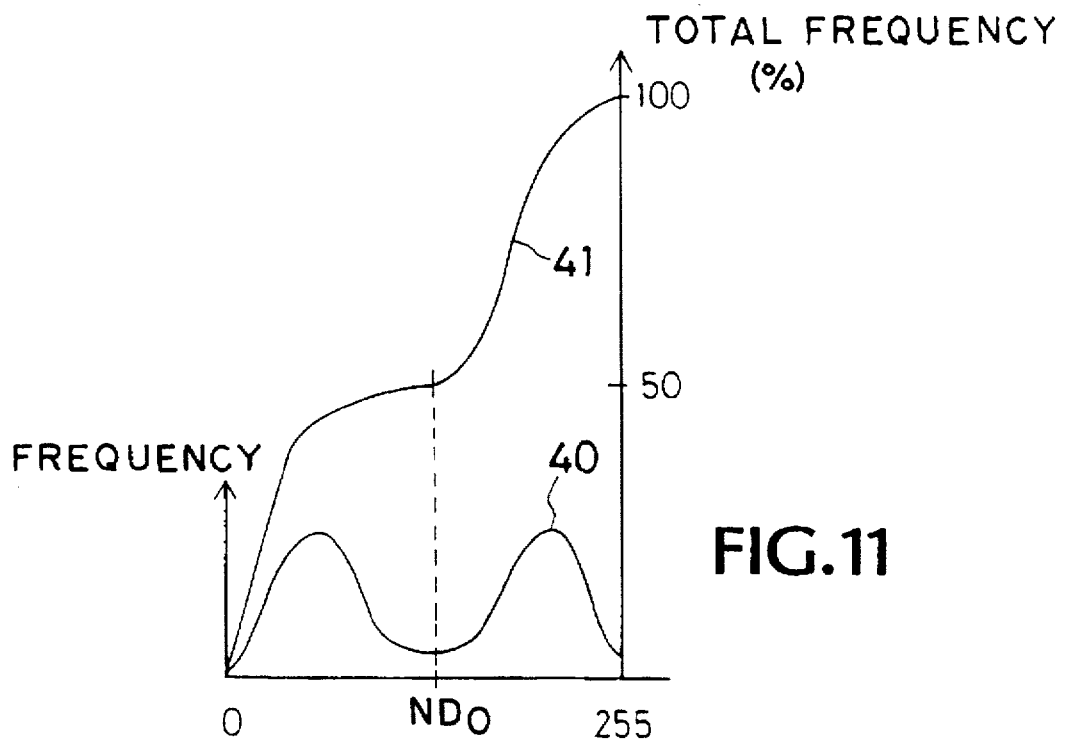
FIG. 11 is a view showing how to find the threshold value for constructing mask data on the pixel copy scheme.
Figure 12:
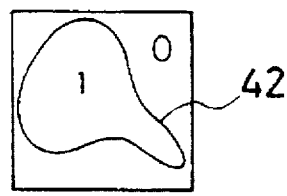
FIG. 12 is a view for illustrating the binary processing for constructing mask data.

Following smoothing, the automatic mask generator 34 operates to calculate a histogram for a pixel density value and find a threshold density value at which frequency of a given pixel density occurrence is minimized between density values associated with peaks of the histogram, and then determines binary equivalents for the interior and exterior portions of the rectangular region to perform binary processing and generate a mask for the source pattern. Explaining this illustratively with reference to FIG. 11, for instance, now let 40 and 41 denote the frequency and total frequency of the density values of the pixels within, the smoothed rectangular region. Then, the density value $ND_o$ at which frequency is minimized between the two peaks is taken as a threshold value. Now suppose that the profile shown at 42 in FIG. 12 is the contour defined by this threshold value in the smoothed rectangular region. Then, the mask for the source pattern is generated using binary numbers [1, 0] denoting the interior and exterior of the profile 42, respectively. This enables the exterior of the profile 42 to be constantly masked. Note that the threshold value may be arbitrarily determined by the input means 4.

With the mask generated in the above manner, glitch removal is fundamentally performed by moving the source pattern to other positions for copying. Provided to this end are at least the following commands.

(1) Dragging Command

According to the pixel copy scheme wherein the source pattern is moved to other positions for copying, a dragging command is used to drag the source pattern to a desired position. With the dragging command indicated and the destination of the source pattern indicated by a cursor, the pixel block transfer means 31 uses the indicated position as a target to transfer a pixel block on that target location to a target transfer buffer 33, thereby copying the content of the source buffer 32 to the target location with reference to the mask pattern generated in the automatic mask generator 34. As will be appreciated by those skilled in the art, the pixel block transferred to the target buffer 33 is used to return the old target location to the original one, when the target location is altered by the next cursor addressing.

Figure 13:
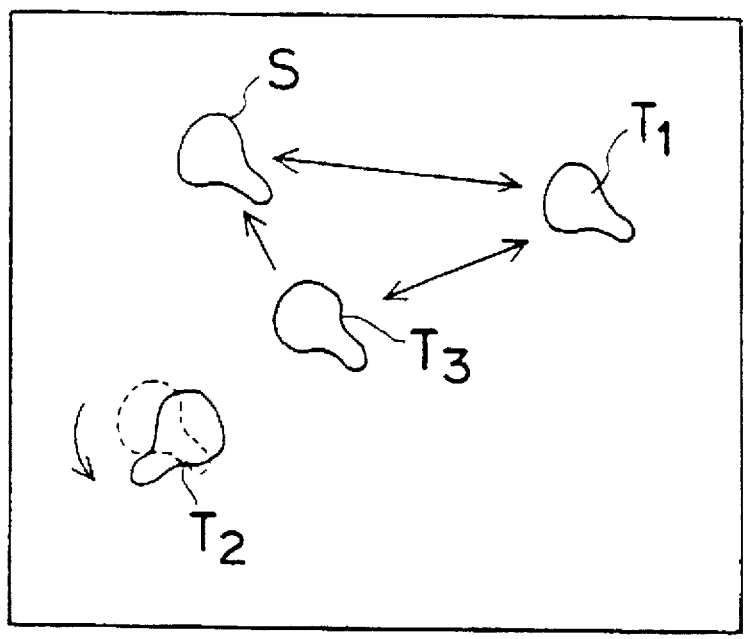
FIG. 13 is a view for illustrating the operation of the pixel copy scheme.

Referring illustratively to FIG. 13, for instance, in order to move a source pattern S to a target position $T_1$, the operator picks up the source pattern S using a mouse, and then moves it to the position $T_1$. This allows the pixel block transfer means 31 to extract at the target location $T_1$ the pixels from a rectangular region of the same size as that when the source pattern S has been indicated, and writes them in the target buffer 33. Subsequently, the pixel block transfer means 31 writes the pixels in a region defined by the mask pattern [1] of the content of the source buffer 32 in the target location $T_1$ with reference to the mask patterns generated in the automatic mask generator 34. By doing so, the source pattern located at S in FIG. 13 has been copied to the target location $T_1$. The result is sent to the display processing means 13 for display on the monitor 14.

Next, when the target location is changed from $T_1$ to $T_2$, the content of the target buffer 33 is returned to $T_1$, followed by the same operation as mentioned above, using $T_2$ as a new target location.

(2) Rotating Command

According to the pixel copy scheme, copying is achievable not only when the source pattern is moved but remains at a fixed orientation, but also when it is moved and rotated through a given angular increment from, e.g., 90° to 360° either clockwise or counterclockwise it is a rotating command which does this. With the rotating angle indicated by the rotating command, the pixel block transfer means 31 operates to copy the content of the target buffer 33 to the original location of the target pattern with reference to the mask data. Then, the content of the source buffer 32 and the mask data generated in the automatic mask generator 34 are rotated by the angle indicated, so that while they are being rotated, the content of the target location is copied to the target buffer 33 and the content of the source buffer 32 is copied to the target location with reference to the mask data.

Explaining this with reference to FIG. 13, for instance, in order that a pattern located at the target position $T_2$ and shown by a dotted line is rotated through 90° in the clockwise direction, the pixel block transfer means 31 operates first to write at the target location $T_2$ the pixels in a rectangular region of the same size as that when the source pattern S has been indicated in the target buffer 33. Then, the content of the source buffer 32 and the mask data in the automatic mask generator 34 are rotated through 90° in the clockwise direction, so that while they are being rotated, the content of the target location $T_2$ is taken in the target buffer 33 and the content of the source buffer 32, the pixels in a region having mask data [1] are written in the target location $T_2$. This enables the pattern lying at the position $T_2$ and shown by a dotted line in FIG. 13 to be rotated into the location lying at the same position and shown by a solid line. This result is sent to the display processing means 13 for display on the monitor 14.

(3) Source Pattern Erasing Command

In glitch removal using the pixel copy scheme, it is required to erase the pattern at the original location in order to move the source pattern to another position. It is a source pattern erasing command which does this. With that command and the target location indicated, the pixel block transfer means 31 operates to copy the content of the target buffer 33 to the source pattern location with reference to the mask pattern.

Explaining now this with reference to FIG. 13, for instance, in order to erase the source pattern shown therein and copy the pattern lying at a target location $T_3$ to that position, the pixel block transfer means 31 operates to extract from the target location $T_3$ the pixels from a rectangular region of the same size as the rectangular region by which the source pattern S has been indicated and write the extracted pixels in the location of the source pattern S in accordance with the mask data [1]. This enables the source pattern S to be erased and the pattern lying at the target location $T_3$ to be copied to that position in FIG. 3. This result is displayed on the monitor 14.

(4) Pattern Replacement Command

This command is used to copy the pixels lying at a first target location to a second target location, using the mask data for the source pattern. With the first target and that command indicated, the pixel block transfer means 31 operates to place the contents of the target buffer 33 to the first target location while copying the pixels of the pixel block lying at the first target location to the source buffer 32. With the second target indicated, the pixel block to be copied, lying at the second target location, is then transferred to the target buffer 33 and the content of the source buffer 32 is then copied to the second target location according to the mask data.

For instance, assume that, in FIG. 13, an instruction is given to pick up the pixels lying at the target location $T_1$ and copy them to the target location $T_3$. The pixel block transfer means 31 operates to return the content of the target buffer 33 to the target location $T_1$ and write the pixel block lying at the target location $T_1$ in the source buffer 32 and the pixel block lying at the target location $T_3$ in the target buffer 33, respectively. Next, the content of the source buffer 32, the pixels in a region having mask data [1], are written in the target location $T_3$. This enables the pixels in the target location $T_1$ to be copied to the target location $T_3$ in FIG. 13. This result is displayed on the monitor 14. As will be understood by those skilled in the art, the pixel block lying at the target location $T_3$ is transferred to the target buffer 33 so that it may be returned to its original state immediately, if the result of copying is found to be undesired.

In addition to the above four commands which have been explained at great length, there are other commands, for instance, a command for clearing the old target location data and the content of the target buffer 33 and returning them to the initial states to execute pixel copy, and an exit command which is operable to copy the content of the target buffer 33 to the original target location with reference to the mask data to return the image to the original state and escape from pixel copy. These commands may be used in various combinations to remove glitches.

The foregoing are the interactive mode operations, and the commands, cursor coordinates, etc. indicated in the interactive mode are recorded in command recorder means 37 in the order manipulated by the input means 4.

Following completion of the interactive mode, the batch mode is started up. During the batch mode, the image data of the original endless pattern are written in the image memory 30, and the commands, cursor coordinates, etc. recorded in the command recorder means 37 are read out in order and input to command control means 35 for execution. As a result, the same processing operations as performed by the operator in the interactive mode are applied to the endless pattern data to remove glitches.

According to the pixel copy scheme as explained above, even glitches found in an abstract pattern of relatively large size can be removed simply and easily.

In what follows, the third or Fourier transform scheme for glitch removal will be explained.

As already stated, some glitches may ensue from the density variations of a unit material. The Fourier transform scheme for glitch removal is designed to eliminate the density variations of the unit material—which will end up with glitches—at the endless pattern step. Usually, this scheme is carried out prior to glitch removal on the above scramble and pixel copy schemes.

Figure 14:
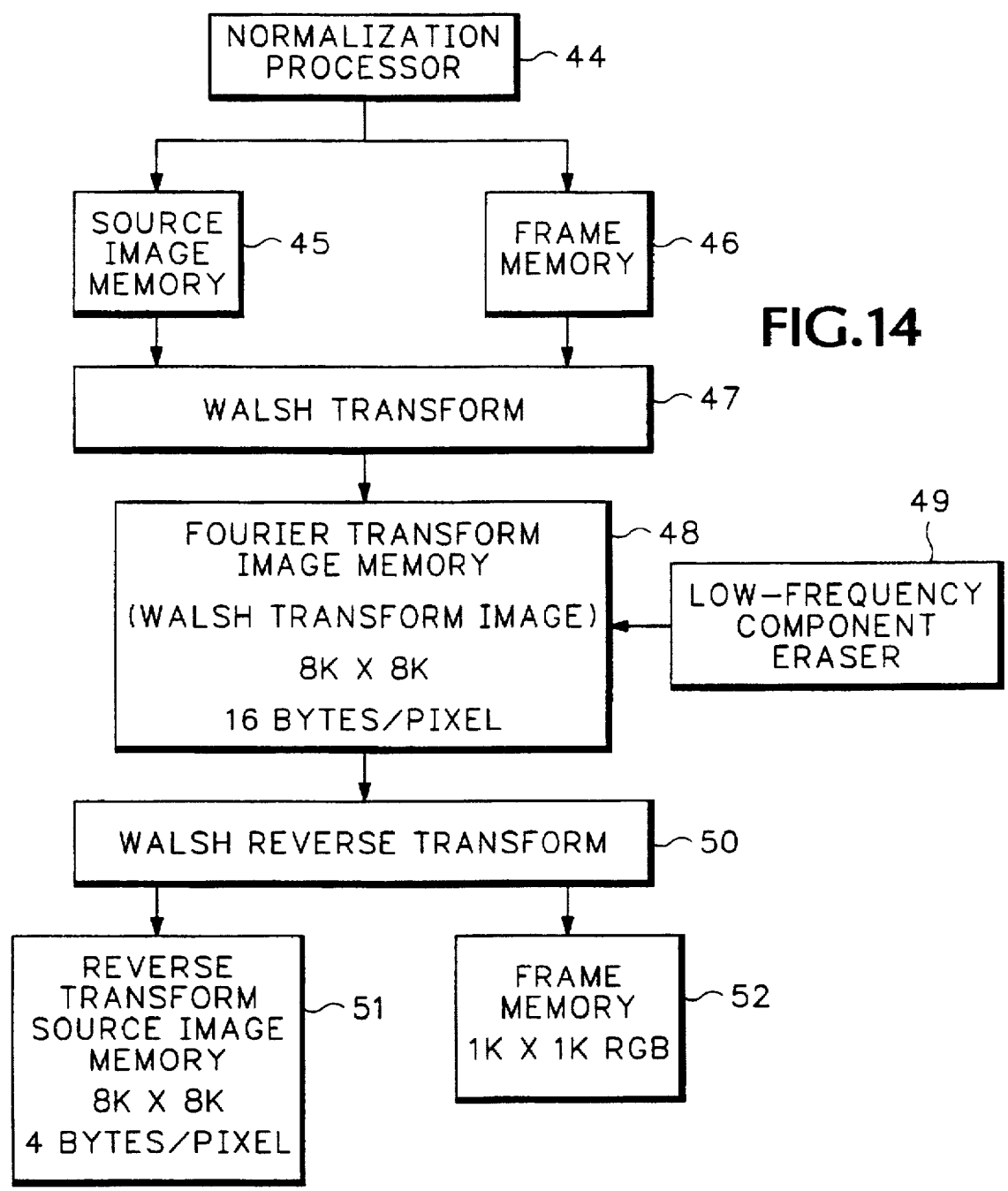
FIG. 14 is a block diagram showing one example of the construction for glitch removal using a Fourier transform scheme.
Figure 15:
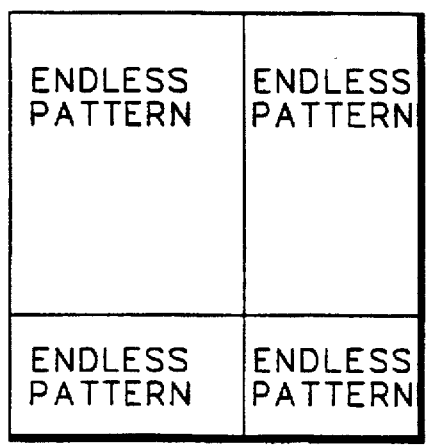
FIG. 15 is a view for illustrating the operation of a normalization processor.

A glitch removal processor 11 for performing glitch removal according to the Fourier transform scheme is constructed, as shown in FIG. 14. With glitch removal according to the Fourier transform indicated, image data of the endless pattern are transferred to normalization means 44. The so-called fast Fourier transform (FFT) algorithm is applicable to a source image having a number of source pixels that is an integer power of 2. The normalization means 44 provides the required number of source pixels by filling in, as shown in FIG. 15, pixels beyond the number of pixels in the rows and columns of the endless pattern.

The source image, which has been converted into the image data having a pixel number that is an integer power of 2 in the normalization means 44, is written as such in a source image memory 45, while a given number of pixels are culled out of the source image for writing in a frame memory 46. This is because testing must be performed with a limited number of pixels due to the fact that the time needed for Fourier transform processing increases in proportion to the number of pixels. Then, the content of the frame memory 46 is sent to the display processing means 13 for display on the monitor 14. Bear in mind that the memory capacity of the source image memory 45 must be about 8K×8K×4 (bytes), because it must be 1 byte per pixel for each of the colors Y, M, C and luminosity K. Note also that the capacity of the frame memory 46 may be about 1K×1K (bytes) for each color of the R, G and B colors.

Figure 16:
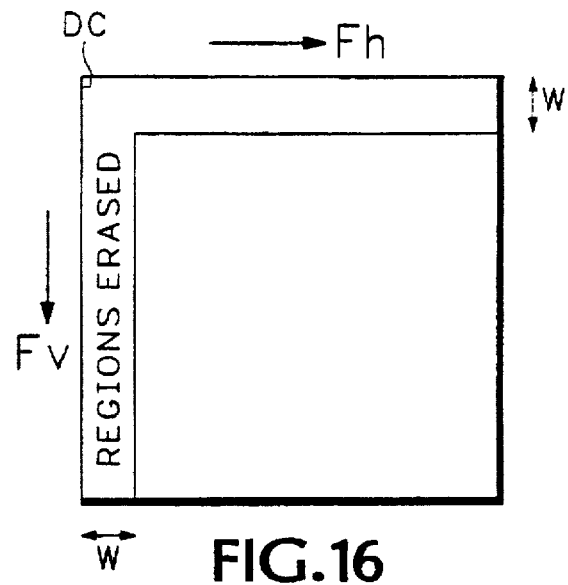
FIG. 16 is a view for illustrating the operation of a low-frequency component eraser.

The respective contents of the source image memory 45 and frame memory 46 are Fourier transformed through a Walsh transform processor 47 for writing in a Fourier transform memory 48. Then, the content written in the Fourier transform memory 48 is cleared of components having a given frequency W or less, say, 10 or less, of horizontal and vertical frequencies $F_h$ and $F_v$, with the exception of a d.c. component DC in a low-frequency component eraser 49, as shown in FIG. 16, and a two-dimensional Fourier transform is performed in a Walsh reverse transform processor 50, so that image data of the source image memory 45 and image data of the frame memory, from which some pixels have been extracted, are written in a reverse transform source image memory 51 and a frame memory 52, respectively. The image data written in the frame memory 52 are displayed on the monitor 14 through the display processing means 13, allowing the operator to confirm if the density variations have been removed by viewing the screen of the monitor 14.

Usually, outputting from the frame memory 46 to the frame memory 52 is the first to be performed, and after confirmation on the monitor 14, the image in the source image memory 45 is manipulated.

Applicants' experimentation indicates that the density variations could be almost completely removed by erasing frequencies of 10 or less, both vertical and horizontal. For this reason, the low-frequency component eraser 49 is designed to erase such frequency components as mentioned above. As will be apparent to those skilled in the art, the frequency components to be erased may be indicated by the input means 4.

When a unit material or baby plate varies in density, the unit material must be once again photographed to remove such density variations according to the conventional processes. According to this invention, however, they can be easily removed on the image data, contributing to considerable cost and work load reductions.

While the three glitch removal schemes have been described, it is understood that almost every glitch can be removed by a suitable combination of these schemes.

Figure 17:
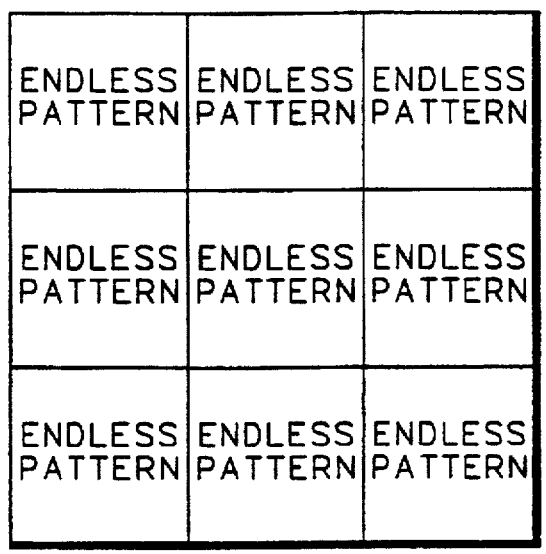
FIG. 17 is a view for illustrating how to make a baby plate.
Figure 18A:
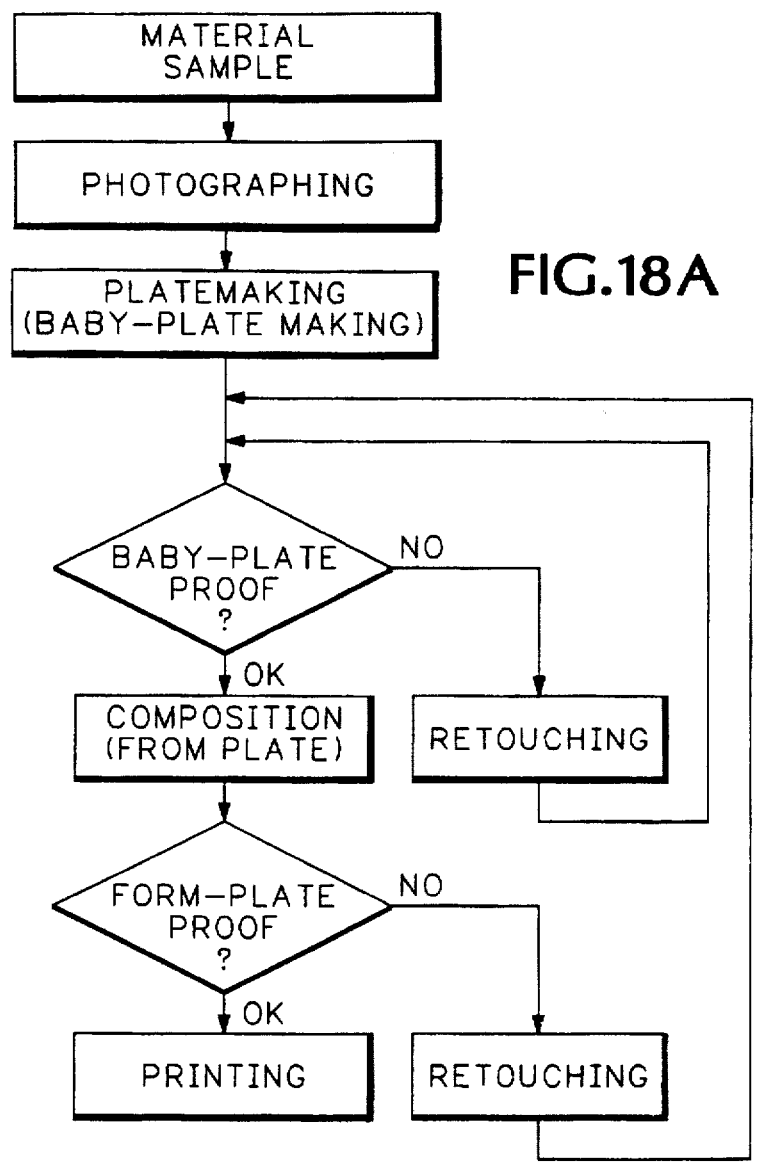
FIG. 18 is a block diagram showing an example of one conventional platemaking system for printing abstract patterns on architectural materials.
Figure 18B:
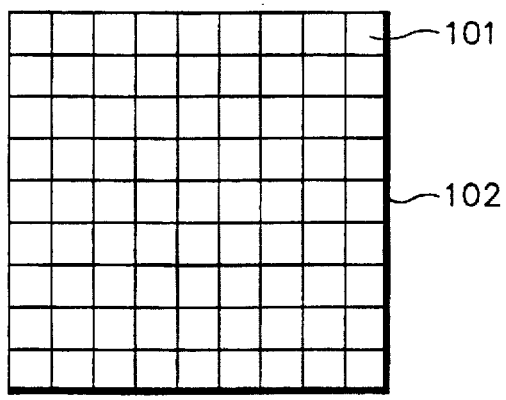
Figure 19A:
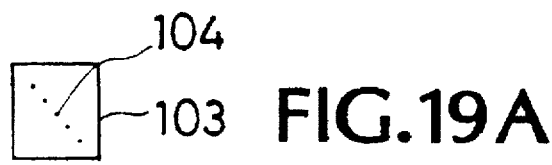
FIG. 19 is a view for illustrating glitches.
Figure 19B:
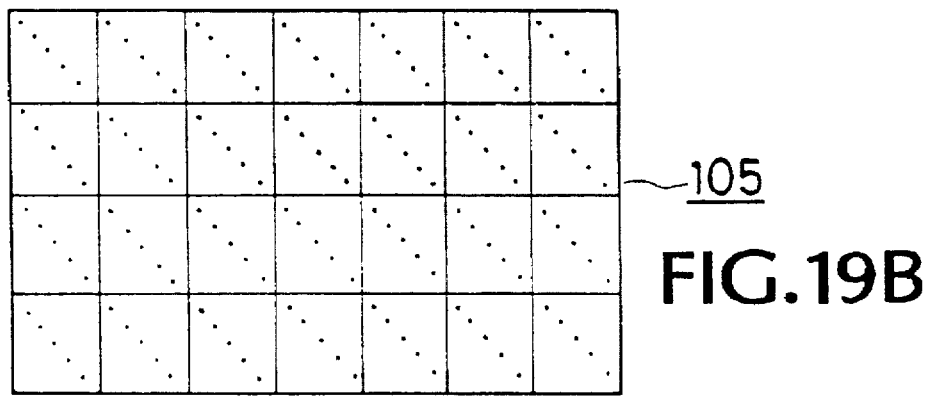
Figure 19C:
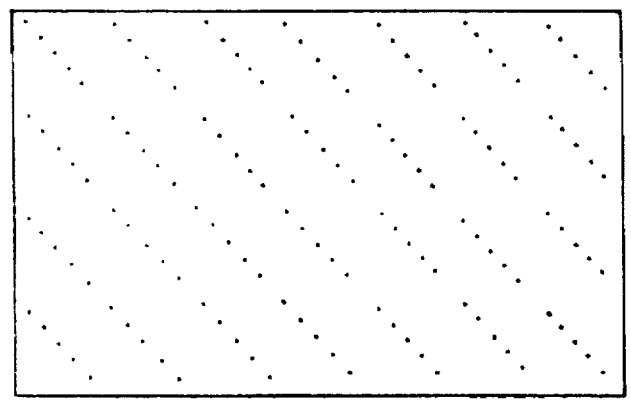
Figure 19D:
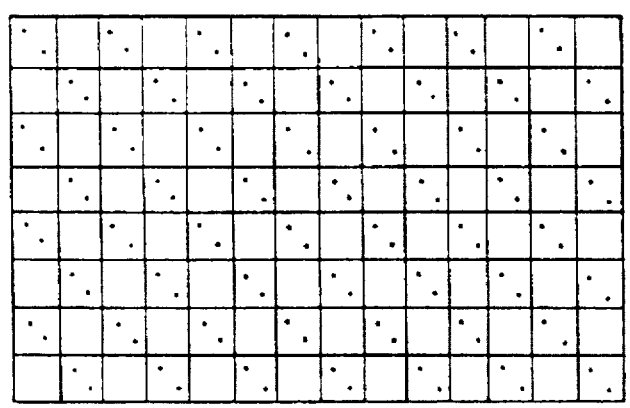

The foregoing are the process of Step S4 shown in FIG. 2, and if glitches are removed at the endless pattern step, then data of the baby plate are constructed (Step S5). As shown in FIG. 17, the baby plate is made by simply repeating the endless pattern vertically and horizontally, and provided to this end is a step-and-repeat processor 12. That is, with baby-plate making indicated by the input means 4, the step-and-repeat processor 12 is started up to arrange image data on the endless pattern a given number of times both vertically and horizontally.

The thus generated baby-plate data are registered in the storage means 5.

Following completion of the baby-plate making, whether or not there is a glitch on the baby plate is again checked out (Step S6). In this case, confirmation of whether or not there is a glitch may be done by viewing the baby-plate data displayed on the monitor 14, from which some pixels have been extracted. It is preferable, however, that this be done by supplying the baby-plate data from the storage means 5 to the color hard copy 7 for hard-copying, because the baby plate is large and used for representation to the user.

If a glitch is detected at Step S6, then the above glitch removal is again done at Step S4, but if no glitch is found, then the baby-plate data are output (Step S7). For outputting the baby-plate data, there are two approaches; according to one approach the baby-plate data are supplied directly to the gravure engraving machine 6 to make a press plate directly and according to the other the baby-plate data are output to a film by the output scanner 2 to make a press plate using that film. Using either of the two may be a matter of option.

Following making the press plate of the baby plate in the above manner, it is used to print a proof, with which whether or not there is a glitch is again checked out (Step S8). If there is a glitch, then the operator goes back to either Step S1 to reread the unit material or Step S4 to remove the glitch at the endless pattern stage. If the operator goes back to Step S1, it means a waste of all the steps done so far. However, this waste is limited to a minimum, because the present process is more reduced in cost and work load than the conventional processes owing to being automated.

If no glitch is detected with the proof using the baby plate, then data on a form plate are output (Step S9). This is done by arraying the baby-plate data a given number of times both vertically and horizontally with the step-and-repeat processor 12, and the thus generated form-plate data are registered in the storage means 5, whence they are output. As in the case of outputting the baby-plate data, the form-plate data may be supplied to the gravure engraving machine 9 to make a form plate directly, or alternatively may be output to a film by the output scanner 2 to make a press plate using that film.

Following outputting the form-plate data in the above manner, a proof is again printed for the last checking (Step S10). If a good result is produced, then the form plate is used for printing with an actual printing machine (Step S11). With this step, the entire process is completed. Note that if there is a glitch on the proof of the form plate, then the operator goes back to either Step S1 or S4.

While this invention has been described with reference to one specific embodiment, it will be apparent to those skilled in the art that the invention is not limited thereto and various changes or modifications may be feasible within the spirit or scope of the invention.

We claim:

1. A method for making a printed material comprising the steps of:

(a) compositing, by copying, image data of a unit material, read only once by an input scanner, M times vertically in adjacent but overlapping relation (where M is a positive integer) and N times horizontally in adjacent but overlapping relation (where N is a positive integer) in a given space, said compositing comprising performing dissolve-compositing in overlapping regions between adjacent composited image data, for providing a pattern of a predetermined size;

(b) determining whether an undesired pattern is present in the pattern;

(c) if no undesired pattern is determined in step (b), forming a press plate on the basis of the pattern, and otherwise modifying the pattern and forming a press plate on the basis of the modified pattern; and (d) using said press plate for printing an image on a print receiving material, wherein the modification of step (c) comprises:

(i) providing mask data representative of a given shape;

(ii) applying mask data to a first location and removing first data of the pattern corresponding to the given shape defined by the mask data;

(iii) replacing the removed data of (c) (ii) with predetermined second data in accordance with the mask data, thereby replacing data of the first location with said predetermined second data in accordance with the mask data;

(iv) applying the mask data to the pattern at a second location and removing data therefrom, corresponding to the given shape defined by the mask data, thus providing new data as said second data;

(v) replacing the removed data of (c) (iv) with said first data of the pattern corresponding to the given shape defined by the mask data, thereby replacing data of the second location with that of the first location in accordance with the mask data; and (vi) repeating steps (i)–(v) a plurality of times for new first and second locations.

2. A printed material according to claim 1 wherein the first and second locations of stesp (c)(ii) and (c)(iv) are determined at random for each procedure.

3. A method according to claim 1, wherein the mask data is generated according to data of the pattern at one of said first and second locations.

4. A plate making system for generating an abstract pattern for printing on architectural materials, comprising:

input scanner means for scanning a unit material and producing first image data;

first means for compositing the first image data M times vertically in adjacent but overlapping relation and N times horizontally in adjacent but overlapping relation, wherein M and N are positive integers, said first means performing dissolve-compositing in overlapping regions between adjacent composited first image data, for generating second image data of an abstract pattern;

second means for determining if an undesired pattern is present in the second image data;

third means for modifying said second image data and generating modified second image data for removing the undesired pattern if an undesired pattern is determined by said second means; and fourth means for forming a press plate according to said second image data if no undesired pattern is determined, and otherwise forming the press plate according to said modified second image data, wherein the third means comprises means for providing mask data representative of a given shape, means for applying the mask data to the second image data at a first location and a second location to select first data for swapping and second data for swapping, and means for swapping said first data for swapping with said second data for swapping, and means for operating said providing means, said applying means and said replacing means a plurality of times using new first and second locations for eliminating said undesired pattern.

5. A plate making system according to claim 4 further comprising means for randomly determining the first and second locations for each operation of the applying means.

6. A plate making system according to claim 4, wherein said means for providing mask data comprises means for generating mask data from a portion of the second image data, and said means for swapping comprises means for copying data of the second location to the first location on the basis of said mask data for eliminating said undesired pattern.

7. A system for generating an abstract pattern for printing on architectural materials, comprising:

input scanner means for scanning a unit material and producing first image data;

first means for compositing the first image data with itself M times vertically and N times horizontally in adjacent but overlapping relation, wherein M and N are positive integers, for generating second image data of an abstract pattern, said compositing comprising dissolve-compositing in overlapping regions between adjacent composited image data;

second means for determining if an undesired pattern is present in the second image data; and third means for modifying said second image data and generating modified second image data for removing the undesired pattern if an undesired pattern is determined by said second means, wherein the third means comprises means for providing mask data representative of a given shape, means for applying the mask data to the second image data at a first location and a second location to select first data for swapping and second data for swapping, and means for swapping said first data for swapping with said second data for swapping, and means for operating said providing means, said applying means and said swapping means a plurality of times using new first and second locations for eliminating said undesired pattern.

8. A system according to claim 7 further comprising means for randomly determining the first and second locations for each operation of the applying means.

9. A system according to claim 7, wherein said means for providing mask data comprises means for generating mask data from a portion of the second image data, and said means for swapping comprises means for copying data of the second location to the first location on the basis of said mask data for eliminating said undesired pattern.

* * * * *